Sept. 12, 1961 CARL-ERIK GRANQVIST 2,999,389
GYROSCOPE DEVICE WITH VIBRATING GAS PARTICLES OR
PARTICLES OF ANOTHER SOUND TRANSFERRING MEDIUM
Filed March 9, 1959 2 Sheets-Sheet 1
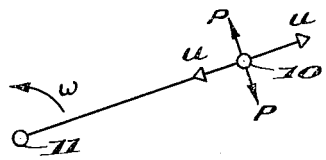
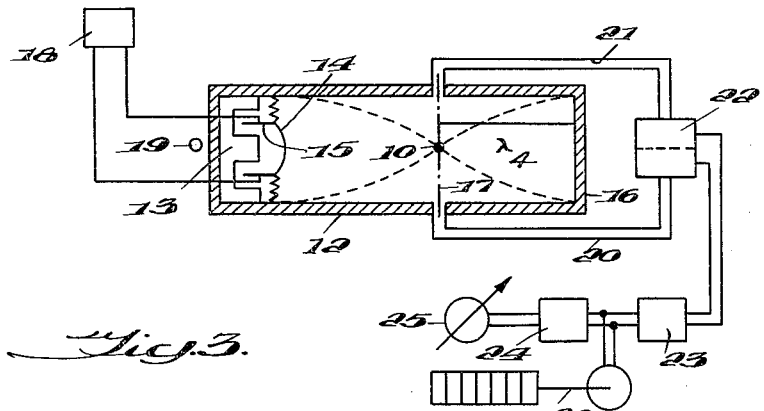
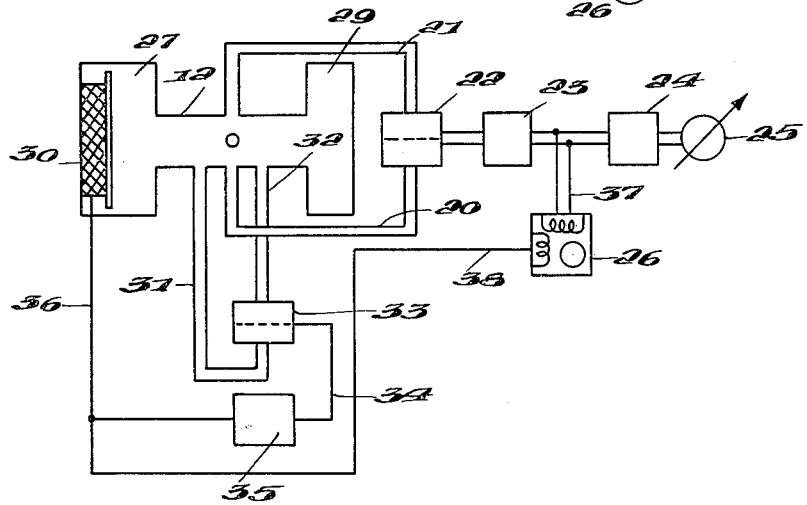
INVENTOR
CARL-ERIK GRANQUIST,
BY *Larson and Taylor*
ATTORNEYS Sept. 12, 1961 CARL-ERIK GRANQVIST 2,999,389
GYROSCOPE DEVICE WITH VIBRATING GAS PARTICLES OR
PARTICLES OF ANOTHER SOUND TRANSFERRING MEDIUM
Filed March 9, 1959 2 Sheets-Sheet 2

INVENTOR
CARL-ERIK GRANQUIST,
BY Larson and Taylor
ATTORNEYS

United States Patent Office 2,999,389
Patented Sept. 12, 1961

2,999,389
GYROSCOPE DEVICE WITH VIBRATING GAS PARTICLES OR PARTICLES OF ANOTHER SOUND TRANSFERRING MEDIUM
Carl-Erik Granqvist, Lidingo, Sweden, assignor to Svenska Aktiebolaget Gasaccumulator, Lidingo, Sweden, a corporation of Sweden
Filed Mar. 9, 1959, Ser. No. 798,037
Claims priority, application Sweden Mar. 10, 1958
16 Claims. (Cl. 73—505)

The gyroscopes, hitherto used, have generally been provided with a rapidly rotating solid body, the so-called gyro rotor, which was made subject to either changes in position or changes in direction of the body on which the gyro rotor was mounted, for instance a vessel, or which turned in the space in order to avoid such changes in position or direction, usually within a cardanically acting gimbal device, which indicated the magnitude of said changes of position or direction. The opinion that a gyroscope therefore must contain a rotor in the form of a solid body, thereby has been established to such a degree that most people skilled in the art could not imagine the possibility of a gyroscope without a real rotor.

The present invention, however, relates to a rotorfree gyroscope, which uses, instead, in order to provide an indication of the changes in space of position or direction, the influence of the Coriolis effect on freely movable molecules, preferably the molecules of materials which are gas-formed in their state of aggregation occurring within the gyroscope, said molecules thereby being subjected to sustained longitudinal waves.

According to the invention, the device contains a sound conductor for sustained, longitudinal waves. While this conductor is in the present application called a sound conductor, it is understood that this term includes any conductor for sustained, longitudinal waves, following the normal laws acting for sound waves, even if the waves concerned should not, in the practical embodiment of the device, fall within the normal acoustic range of audibility. According to the invention, the sound conductor is further combined with means for creating and maintaining the sustained, longitudinal waves as well as with means for transferring the changes of the state of the sustained longitudinal wave, to means for indicating said change of state.

By the invention, the accuracy of gyroscopes will be substantially improved. As a matter of fact, prior art provided with rotors have suffered from the disadvantage that the accuracy was difficult to maintain. The reason for this was threefold. The first and most important reason for lack of accuracy in rotor gyroscopes was the difficulty, statically as well as dynamically, of balancing the rotor. As an example it may be mentioned that an unbalance or in other words the radial distance between the gravity point of the rotor and the rotation axis of the rotor of said measure of only $1\mu$, or $1^{-3}$ mm., caused a movement of position of $1°$ angular measure per hour of time. The other and most important reason for lack of accuracy in rotor-provided gyroscopes has been the friction in the gimbal hinges. This friction increases along with the wearing of the hinges, and this factor limits the lifetime of rotor gyroscopes. As an example it may be mentioned that a rotor gyroscope, according to what has been statistically proved, cannot be regarded as reliable without careful revision with improvement and possible replacement of wornout parts. The third, and also rather important reason for decreased accuracy of rotor-provided gyroscopes has been the difficulty in manufacturing both stable and easily movable gearings for the rapidly rotating rotor shaft. As a matter of fact, the high rate of rotation causes very strong strain on the rotor gears, if even rather small unbalance should exist, and as soon as wearing has occurred in the gears, the speed of the rotor will also decrease.

All of these disadvantages are avoided according to the invention. This invention will below be further described in connection with some different embodiments, shown in the attached drawings, in which FIG. 1 shows a schematically reproduced picture of the forces, to which an oscillating particle is subjected when changing the position or the direction of the oscillation path of the said particle, FIG. 2 shows a very simple form of execution of a gyro device according to the invention, and FIG. 3 shows an improved form of execution of the device shown in FIG. 2. FIG. 4 shows a double-acting gyro device, and FIG. 5 shows a system of two gyro devices of the common kind, indicated in FIG. 4. FIG. 6, finally, shows a modified arrangement, in which a rotating sound field is created.

According to the invention, liquid may be used, but as a rule it is more advantageous to use a gas as the oscillating medium, and the following description will, therefore, relate the devices wherein the oscillating medium is formed by a gas. One part of the gas, which may in its simplest form be regarded as represented by a molecule of the gas, shall first be examined for clarifying the forces acting on the same.

It is assumed that the mass of particle is $\rho$, and that it is put into oscillation with a speed, the momentary value of which being indicated with $u$. It is further assumed that by outer compulsory influence the oscillation path of said particle is subjected to a change of position or direction, which may be reduced to the assumed case of a rotational movement about an axis, which is situated in the path of the particle but at some distance from the oscillation center of the particle. The differential of the last mentioned movement will, then, represent a displacement movement in a direction perpendicular to the oscillation movement path of the particle. The rotational movement is assumed to have a momentary value of the angular speed of $\omega$. This case is shown in FIG. 1.

In FIG. 1, 10 indicates the particle assumed to oscillate in sustained, longitudinal oscillations with the momentary value of $u$, as indicated by means of the arrows shown in different directions and carrying this denomination. The axis of the outwardly introduced compulsory movement is indicated 11, and the momentary value of the angular speed of this movement of rotation, to which the compulsory movement is reduced in order to simplifying the calculations, is $\omega$ radians per second. The particle will then be subjected to forces P in synchronism to the oscillation $u$, whereby the value of P will be $$P = 2 \cdot u \cdot \rho \cdot \omega$$

As mentioned above, $u$ is the mometary value of the speed of movement of the particle. Further it has been mentioned that according to the invention the particle 10 shall be put into sustained, longitudinal oscillation. It is assumed that this oscillation is purely sinus-formed and follows the formula $$u = u_0 \cdot \sin \omega_1 t$$

wherein $\omega_1$ is the radionic frequency of the oscillation represented by the letter $u$ and $u_0$ is the amplitude of the same oscillation which will give:

$$P = 2 \cdot \rho \cdot \omega \cdot u_0 \cdot \sin \omega_1 t$$

An arrangement according to the invention is shown in an especially simple form in FIG. 2. In a closed tube 12, an easily movable electro-dynamic system is applied for creating and sustaining the oscillations. This vibration system consists in the magnet 13, the diaphragm 14 and the magnet winding 15. The winding 15 is connected to a generator 18 for providing an electric oscillation of a suitable frequency, for instance a frequency within the higher range of audibility or an ultra-sonic frequency. As a consequence thereof, a sustained longitudinal wave will be formed in the tube 12 which will, thereby, act as a closed organ pipe and consequently create a nodal point in a given plane which is at a distance of $\lambda/4$ from the end wall of the tube at the end, turned away from the vibration system. The end wall is indicated by 16 and the node plane by 17. The particle 10 in this node plane shall now be considered further. For this purpose it is assumed that the movement to which the tube 12 is subjected can, at least during a short moment, be regarded as a rotational movement with an angular speed $\omega$ about an axis 19, extending perpendicular to the longitudinal direction of the tube 12, and consequently also perpendicular to the vectorial direction of the movement speed $u$. It is then obvious that the particle 10 will, according to the law of Coriolis be influenced by emanating forces P, as indicated in the figure.

In the node plane 17 there is provided, on each side of the tube 12 means for measuring the change of pressure or speed of the sustained longitudinal oscillation. These means may comprise in openings, which are connected by means of pressure conduits 20, 21 to an instrument 22. It is then obvious that, if the shaft 19 should accidentally rotate, corresponding to a change of direction of the sound conductor 12, a difference in pressure dependent as to its own frequency on the frequency $\omega_1$ and to its amplitude on the frequency $\omega$, will be created in the form of an acoustic oscillation entering between the two mouths of the pressure conduits 20 and 21. The instrument 22, preferably, comprises a differential microphone, or a microphone influenced on the one side by pressure in the one pressure conduit and on the other side by the pressure in the other pressure conduit, so that its movable means will execute a movement depending upon the difference between the pressures in the two pressure conduits 20 and 21. Such a differential microphone is preferably of the electrodynamic kind and contains a thin metallic tape, movable in a strong magnetic field, so that a voltage is introduced into the metallic tape as the metallic tape moves across the force lines of the electromagnetic field. This voltage, consequently, will also have a frequency equal to $\omega_1$ and an amplitude proportional to $\omega$.

The output conduit from the differential microphone is carried to an amplifier 23, a rectifier 24 and a measuring instrument 25. The last mentioned measuring instrument which, preferably, is of the galvanometric kind, thus will indicate the speed of yawing in a plane, perpendicular to the axis 19. Between the amplifier 23 and the rectifier 24, furthermore a branch conduit is made to an integrating measuring instrument 26, which will, therefore, show angular deviation from an output position of the gyro device.

It should, thus, be observed that the use in practice of the gyro device will not mean that it is kept in rotation about the axis 19, but this has only been shown in order to explain the action of the arrangement. The gyro device is, instead, possibly adjustably mounted on the vessel, for the navigation of which the gyro device will be used. When this vessel is subjected to a yawing movement in a plane, perpendicular to the imaginary axis 19, an indication will be shown on the instruments 25 and 26. Any change of direction of the vessel can, however, always be divided according to a three-dimensional coordinate system which is therefore laid out in such a way, that one of the coordinates agrees with the tangential direction of the imaginary turning movement about the axis 19.

It is also evident that a complete indication of the changes of direction of the vessel can be obtained, if three devices of the kind indicated in FIG. 2 are mounted in the three coordinate directions, that means in the vertical direction, in the north-south-direction, and in the east-west-direction, a complete direction control of the vessel thereby being achieved.

FIG. 3 shows a practical arrangement of one of these three gyro units. The arrangement, as before, contains a tube 12 serving as a sound conductor for sustained, longitudinal oscillations. The tube 12 is, however, divided into three sections 27, 28, and 29, the sections 27 and 29 thereof preferably, but not necessarily, having the same area measured across the direction of the sustained longitudinal oscillation, the section 28, however, having an essentially smaller section area. This measure has been made in order that the amplitude of the oscillation shall be correspondingly increased in the section 28, a stronger difference in measured pressure thereby being obtained between the pressure conduits 20 and 21.

The oscillation generator is, in this case, assumed to comprise a crystal microphone or a crystal telephone 30, and the creation of the electrical oscillation fed thereto takes place by acoustic reaction. Thus, two further pressure conduits 31 and 32 are provided on the same side of the tube 12 in order to achieve the possible maximum amplitude of the tube part 28 which has the smallest section area. One of these pressure conduits is branched off ahead of the node plane through the mouths of the pressure conduits 20 and 21, the other one behind this node plane, so that a rather constant pressure difference will exist between the mouths of the pressure conduits 31 and 32. These pressure conduits are carried to a differential microphone 33, essentially of the same kind as the differential microphone 22, and the output voltage from the differential microphone 33 is fed to an amplifier 35 by conductor 34 and the amplifier feeds the crystal element 30 by conductor 36 with the oscillation thus obtained by acoustic reaction. This will automatically create a frequency such that a nodal plane is created through the mouths of the pressure conduits 20 and 21, provided that the pressure conduits 31 and 32 are branched off at equal distances from this nodal plane, respectively, but it may be suitable, in order to stabilize the frequency, to build into the amplifier 35 resonance circuits, which are tuned for the desired frequency. Thereby, the oscillation will be freer from harmonics of such an order that they would also create nodal planes at the same place, and such a resonance circuit would also add to the amplification of the oscillation, fed to the crystal element 30.

The integrating instrument in the arrangement according to FIG. 3 is assumed to be driven by an alternating current motor, fed with the acoustical frequency, this instrument being for that purpose connected to the output voltage conductor by means of a conductor 37, and also being connected to the output side of the amplifier 35 by means of a conductor 38. A phase difference between the voltages in these two conductors of 90° is present, because the voltage in the conductors 36 and 38 is in phase with the oscillations of the crystal element, whereas the voltage in the conductor 37 is in phase with the oscillation amplitude in the nodal plane through the mouth of the pressure conduits 20 and 21, and finally the plane of the diaphragm of the crystal element 30 represents an oscillation bow, whereas the mouths of the pressure conduits 20 and 21 represent an oscillation node, so that the phase difference between them must be 90°.

In the arrangement according to FIG. 3, the tube 12 has been shown to comprise two enlarged parts and one contracted part, but there may be provided any number $m$ of enlarged parts in the tube, the number of contracted parts then being $m-1$, so that always the two outermost parts are enlarged.

The arrangement can advantageously be made as a push-pull coupled gyro according to FIG. 4. In this arrangement there are two tube-formed conductors 12' and 12", each consisting in two enlarged parts 27' and 29' and also 27" and 29", respectively, and in one contracted part 28' and 28", respectively. The two enlarged parts 27' and 27" are combined in a common chamber, containing the double-acting crystal element 30. The generator of the acoustical oscillation has, in this case, been shown schematically at 39 as an electrical alternating current generator, but it may be made in the same way as shown in FIG. 3. The two differential microphones are indicated at 22' and 22", respectively, and they are connected to the terminals 40 of the indicator instrument. This arrangement operates according to the push-pull principle, so that the output oscillations from the respective differential microphones are in counterphase, the conductors to the terminals 40 are crossed, as seen in FIGURE 4.

In the arrangements, hitherto described, it is especially suitable that the two-phase motor 26 be arranged to drive a base for the gyroscope in order to reset zero voltage from the microphone 22. It should thereby be observed that there is no danger of supercontrol occurring. The closer the gyroscope comes to its zero position, in which there is no difference in pressure between the mouths of the two pressure conduits 20 and 21, the weaker will be the voltage of the oscillation collected from the amplifier, and the lower will be the speed of the motor 26. The sensitivity of the gyroscope will, then, exclusively depend on how easily movable the motor 26 is, and upon the amplification characteristics of the amplifier 23, whereby it is possible to provide practically any accuracy with this arrangement.

When a plurality of gyro units are arranged in the form of a common system for indicating of deviations in direction in two or more directions, Cartesianically connected to each other, it is suitable to mount this system in a compulsorily controlled gimbal hinge with three nodes of adjustment, each controlled by means of one motor corresponding to the motor 26 in order to reset the deviation of direction of the gyro unit influencing the rotation of the motor.

Thus it can be seen that it is not necessary to have three gyro units for achieving an indication in three Cartesian directions, but that it is sufficient to have two gyro units, one of them being provided with a pair of pressure conduit mouths according to a diametrical line through the tube part 28, see FIG. 3, which is perpendicular to the line connecting the mouths of the pressure conduits 20 and 21. As the gyroscope in FIG. 3 is shown in section, only one of these two additional pressure conduit mouths 20' is visible in the figure. The two pressure conduits mouths thereby could be connected by separate pressure conduits to a second system of apparatus corresponding to the parts 22, 23, 24, 25, and 26 for resetting the direction of the gyro unit in space by turning it in a direction perpendicular to the one in which the gyro unit was turned depending upon the difference in pressure between the pressure conduits 20 and 21. On the other hand, it is necessary that a specific gyro unit be used for resetting the direction or for indication of the direction in a direction perpendicular to the plane through the two directions just mentioned, or in other words, in a direction which can be reduced to a turning movement about an axis running in the longitudinal direction of the tube.

From the above it will be evident that under normal circumstances a gyro tube in a three-dimensional gyro system according to the invention, can be assumed to be positioned with its longitudinal direction coinciding with a direction in which sudden and essential acceleration or retardation movements may occur. This is, for instance, the case when the gyroscope is used on an aircraft which is moved in advanced flying, or through an especially uneasy range of air, and also when starting the aircraft. The simple gyro instrument according to FIG. 1, 2 or 3 will then be very sensitive to the forces, created by the acceleration movements and retardation movements, respectively, but this disadvantage is avoided according to the push-pull arrangement, shown in FIG. 4.

A calculation of the values of voltages possible in an arrangement according to the invention will show that the arrangement is not only fully usable but that it will even give an especially high sensitivity. Tests which have been made have confirmed this.

The measuring arrangement was made substantially in accordance with FIG. 3. The length of the tube pipe 28 was 2 cm., and the frequency of the sound wave was 4150 periods a second. The tube was filled with air of a pressure of 10 kg./cm.$^2$. From this one will obtain a density of the air of about 12 kg./m.$^3$ may be calculated. The tube part 28 had further a section area of 0.5 cm.$^2$, and thus the mass of air existing in the tube is $0.6 \cdot 10^{-6}$ kg. The effect on the crystal in combination with the retraction circumstances between the tube part 28 and the chambers 27 and 29 situated on each side thereof, gave a maximal speed of the particles of the oscillating air of 300 meters per second. The measuring was made on the latitude of the city of Stockholm, and regarding the ground rotation speed there, a pressure on the mass element should then be obtained in the order of magnitude of $0.36 \cdot 10^{-4}$ gr. The damping in the pressure conduits, however, results in the fact that only about 25% of this pressure can be expected to be effective in the differential microphone 22. The movable element in this microphone was a tape of aluminium having a plane area of 0.5 cm.$^2$ and a thickness of $5\mu$. Under the influence of the calculated pressure this aluminium tape should then obtain a maximum speed of $1.8 \cdot 10^{-3}$ cm. per second, when influenced exclusively by the pressure from the one pressure conduit. The aluminium tape was placed in a field, which was measured to $10^4$ gauss, and from this was computed, under the said conditions, the created voltage in the differential microphone of 0.18 $\mu$V. This voltage was connected directly to the primary side of a transformer which was calculated for the possible maximum step-up ratio taking into account the resistance in the aluminium tape of measured to 0.1 ohm, which gave a step-up ratio in the relation of 1:1000.

When measuring the voltage on the secondary side of the transformer, this was stated to be 200 $\mu$V which, as seen, is well in agreement with the calculated values. Tests mere also made for finding out the sensitivity which could be obtained in a resetting motor which, controlled by this voltage after due amplification, acted upon a gimbal frame for zero setting of the gyroscope, and thereby, it proved that the sensitivity was 0.001° angular measure per hour time measure, which is essentially more than could hitherto be achieved with any existing gyroscope having a rotor of solid or fluid material.

The sensitivity, however, can probably be further increased. Thus, it is known that the speed of particles during the oscillation of a sound wave is reversed proportional to the speed of sound in the oscillating medium, and therefore one can use a gas-formed medium or a fluid-formed medium of sound speed may be used. As such medium, among others, hydrogen bromide and certain heavier hydrocarbons have been tested and found to be suitable. But it should be observed that the speed of sound is dependent upon the pressure in the medium and when it was proposed above to use a medium under an increased pressure of, for instance, 10 atmospheres, the purpose thereof was not to increase the speed of sound, but merely to achieve a higher sound pressure in the mouths of the pressure conduits 20 and 21, at a given speed of sound.

When the speed of sound is lowered artificially in the above mentioned way, regard must also be taken that the area of the retracted part 28 of the sound conductor is not too small. As a matter of fact, this could cause such high sound speeds, that the oscillating medium would no longer be in an adiabatic state, which would act such that a further increase of the sound speed would not increase but, to the contrary, decrease the measuring power. A certain insurance against this non-adiabatic state occurring is also achieved by working with a gas-formed medium under increased pressure, for instance in the order of magnitude of 10 atmospheres.

FIG. 5 shows a complete gyro system for measuring the turning about all three Cartesian axes. A centrally placed sound source 41 causes a sustained wave in the direction of the two axes falling in the level of the paper, viz. the x-axis and the y-axis. The retracted parts of the sound conductors are indicated at 42, 43, 44 and 45, and the enlarged parts at a distance from the sound source are indicated 46, 47, 48, and 49. A change of direction which can be referred to as a rotation about the z-axis is, thereby, measured by means of microphones 50, 51, 52, and 53, which by pressure conduits are connected to the retracted sound conductor parts 42, 43, 44, and 45. A change of direction which can be referred to as a rotation about the y-axis, is measured in a corresponding way by means of microphones which are connected to the retracted sound conductors 42 and 44. For simplifying the mode of showing, these microphones have been shown at 54 and 55, and the pressure conduits to them have not been shown in the drawing. Maintaining the same manner of indication, the microphones 56 and 57 have been shown for indicating a change of direction which can be referred to as a rotation about the x-axis.

In the arrangements hitherto described, there is nothing corresponding to the rotor existing in all older gyroscopes. A certain equivalent thereto can, however, be obtained, if the oscillation creating elements are arranged in such a way as indicated in FIG. 6.

The arrangement of the sound conductors in FIG. 6 is the same as in FIG. 5, but the oscillation creating element has not, as was the case in the arrangement according to FIG. 5, been placed centrally in the middle of the sound conductors crossing each other, but four separate sound creating elements 58, 59, 60, and 61 have been provided within the outer enlarged parts 46, 47, 48, and 49 of the sound conductors. The two oscillation creating elements 58 and 60 are fed in parallel from the generator 39 over a first phase displacement filter 62, and the two remaining oscillation creating elements 59 and 61 are also fed in parallel from the same generator 39, however over a second phase displacement filter 63. The two phase displacement filters 62 and 63 are arranged in such a way, that one will cause a negative phase displacement, the other one causing a positive phase displacement, and the two phase displacements are preferably so dimensioned that the oscillations will be fed to the respective oscillation creating elements 58 and 60 and also 59 and 61, respectively, with the same amplitude, but with 90° phase displacement. They, therefore, cause an acoustically rotating field, influencing the mass particles in the medium with the centre chamber 62, so that these will be brought into asynchronous rotation with the field. At direction changes, the rotating medium will be displaced due to the forces, arising according to the Coriolis law. A pressure difference therefore arises between the two pressure conductors 65 and 66 carried on to a first differential microphone, when turning or changing position in a level, perpendicular to the axial level of the sound conductors 49—45—43—47, and between the two pressure conductors 67 and 68, carried on to a second differential microphone, when turning or changing position in a level, perpendicular to the axial level of the sound conductors 48—44—42—46.

Due to the high rotation speed of the particles in the rotating mass of medium, the arrangement according to FIG. 6 is especially sensitive.

The invention is, of course, not limited to the specific embodiments described above and shown in the drawings, but different modifications may occur within the scope of the invention.

What is claimed is:

1. A gyroscopic device comprising a sound conductor containing a fluid sound conducting medium, means for generating a sustained, standing, longitudinal oscillation within said conductor, and means on opposite sides of a nodal point of said oscillation for measuring changes in pressure of said nodal point when said conductor is displaced in a direction perpendicular to said longitudinal oscillation.

2. A gyroscopic device according to claim 1 wherein said means for measuring changes in pressure at said nodal point include two pressure conduits located on opposite sides of said node, said pressure conduits being connected to opposite sides of a differential microphone and the output voltage of said microphone is connected to indicating means.

3. A device according to claim 2 wherein said differential microphone is of the electrodynamic type having a sound tape movable in a magnetic field.

4. A device according to claim 1 wherein said longitudinal oscillation is of a wave length close to the upper limit of audibility.

5. A device according to claim 2 including two additional pressure conduits located on either side of one of said first named conduits, said additional pressure conduits being connected to opposite sides of a second differential microphone, and means for feeding the output voltage from said second microphone back to said means for creating the longitudinal oscillation.

6. A device according to claim 1 wherein said sound conductor is composed of alternating portions of greater and lesser width, and said nodal point is located within a portion of lesser width.

7. A device according to claim 6 wherein the outermost portions of said sound conductor are of greater width.

8. A device according to claim 6 wherein the portions of lesser width are so dimensioned that the pressure relations under the influence of said longitudinal oscillation will vary in accordance with adiabatic conditions.

9. A device according to claim 1 wherein the sound conducting medium within said sound conductor is a gas under high pressure in the order of 10 atmospheres.

10. A device according to claim 1 wherein the sound conducting medium within said sound conductor is a gas with low sound velocity.

11. A device according to claim 1 wherein the sound conducting medium within said sound conductor is a heavy gas.

12. A device according to claim 1 wherein said sound conductor is rotatably mounted in a level coincident with the axis thereof and including means responsive to said means for measuring pressure changes for returning said sound conductor to its usual position when a pressure change occurs.

13. A gyroscopic device comprising at least one pair of sound conductors containing a sound conducting medium and disposed on a common longitudidnal axis, means for generating a sustained longitudinal oscillation within said conductors in opposite directions, a pair of pressure conduits for each of said conductors disposed on opposite sides of a nodal point of said longitudinal oscillation, a differential microphone connected to each of said pairs of pressure conduits, and means for feeding the output voltages of said microphones to indicating means whereby when said conductors are displaced in a direction perpendicular to said longitudinal axis pressure changes at said nodal points may be measured.

14. A device according to claim 13 wherein a plurality of pairs of sound conductors are disposed in a system of Cartesian co-ordinates.

15. A device according to claim 13 wherein the means for generating said longitudinal oscillations are common for each pair of sound conductors.

16. A device according to claim 14 wherein the means for generating said longitudinal oscillations are disposed at the ends of said sound conductors remote from each other and are fed with voltages of the same frequency but displaced in phase by 90°, whereby a rotating sound field is created.

References Cited in the file of this patent

UNITED STATES PATENTS

| | | |
|---|---|---|
| 2,466,018 | Ferrill | Apr. 5, 1949 |
| 2,514,250 | Meredith | July 4, 1950 |
| 2,546,158 | Johnson | Mar. 27, 1951 |
| 2,627,400 | Lyman et al. | Feb. 3, 1953 |
| 2,683,247 | Wiley | July 6, 1954 |
| 2,753,173 | Barnaby et al. | July 3, 1956 |